June 14, 1949. A. A. C. BAYLE 2,472,879
PROTECTIVE DEVICE FOR THERMAL RECEIVERS
Filed Feb. 27, 1948 2 Sheets-Sheet 1
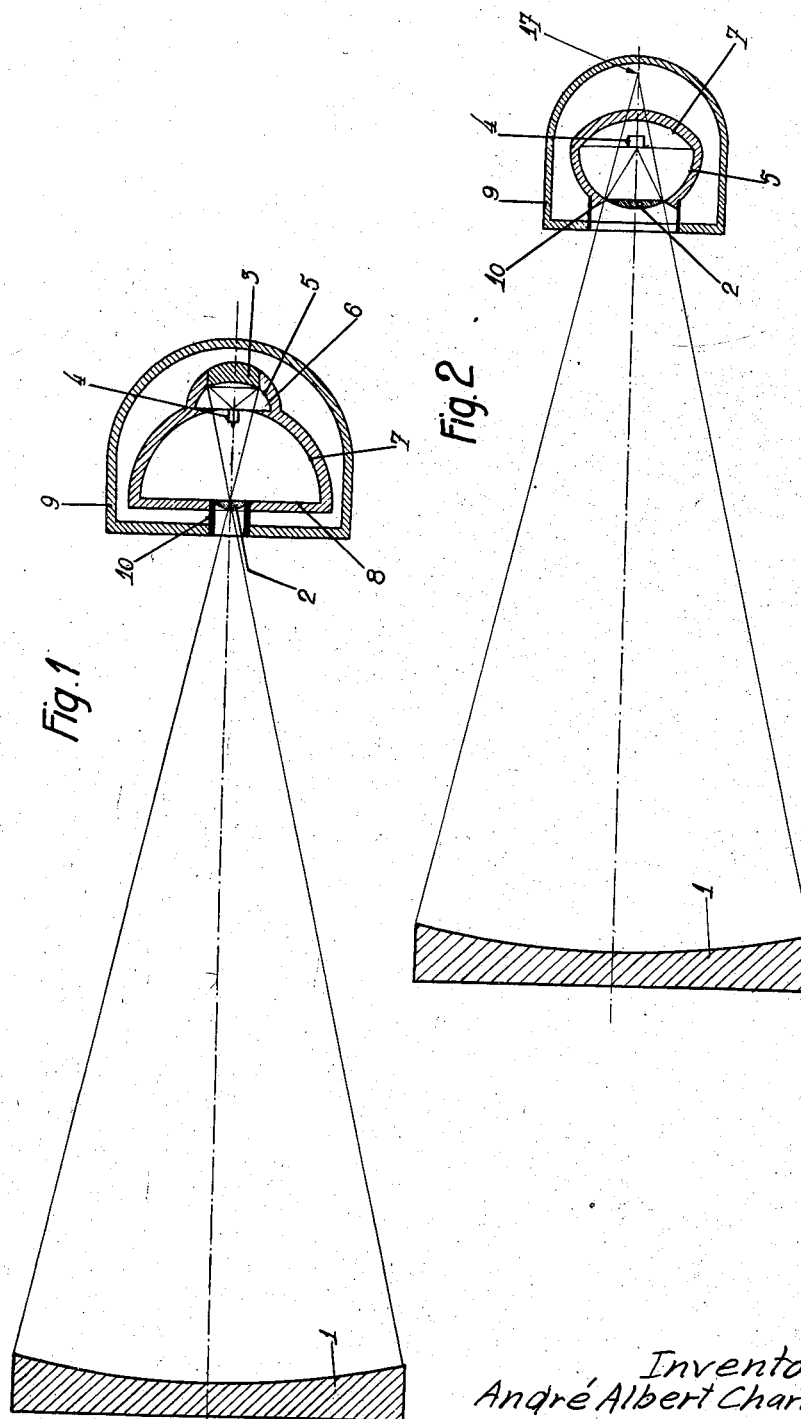
Inventor
André Albert Charles Bayle
By Robert E. Burns
Attorney June 14, 1949.  A. A. C. BAYLE  2,472,879
PROTECTIVE DEVICE FOR THERMAL RECEIVERS
Filed Feb. 27, 1948  2 Sheets-Sheet 2
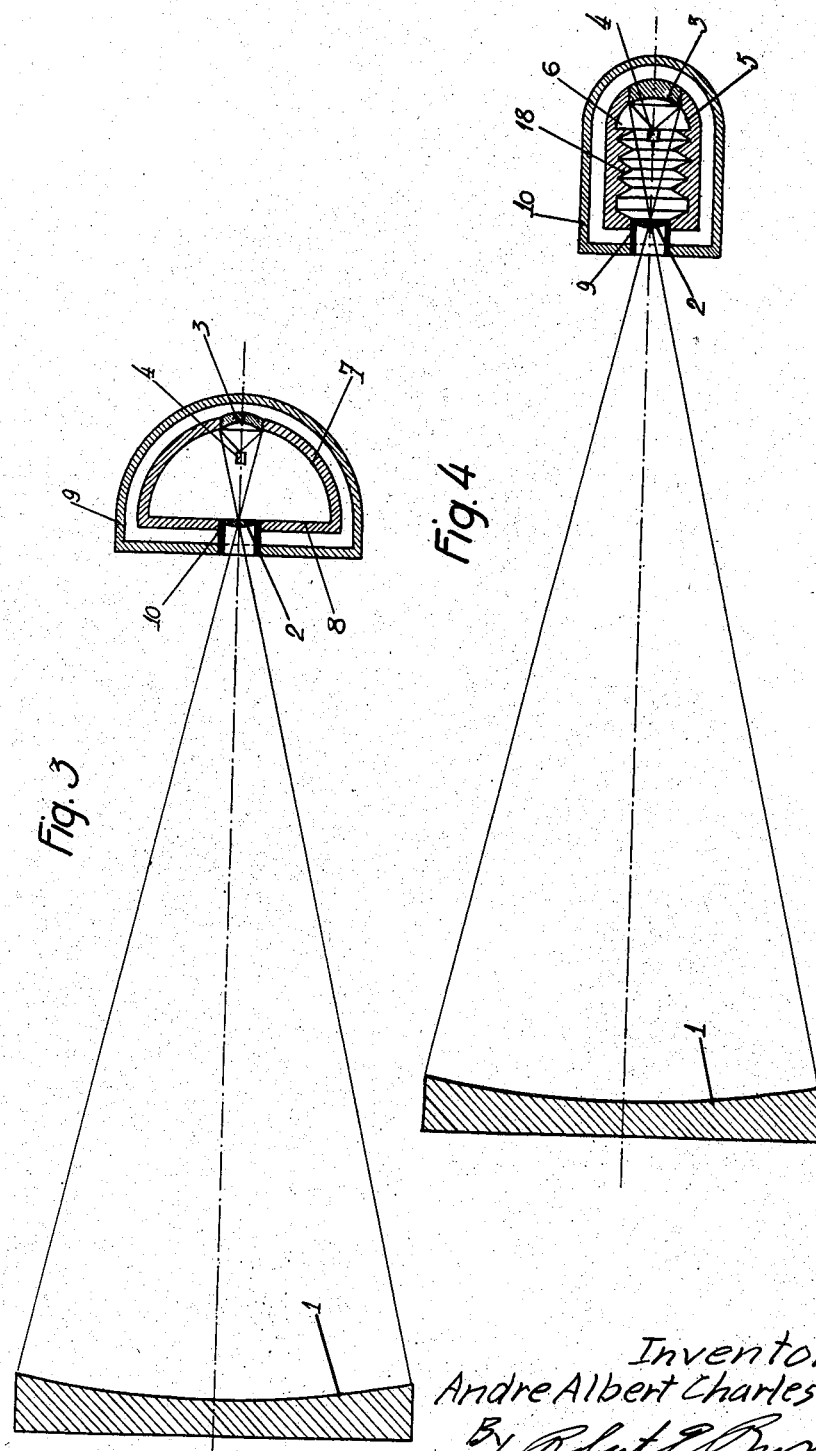
Inventor
Andre Albert Charles Bayle
By Robert E Burns
Attorney Patented June 14, 1949

2,472,879

UNITED STATES PATENT OFFICE 2,472,879

PROTECTIVE DEVICE FOR THERMAL RECEIVERS

André Albert Charles Bayle, Boulogne-sur-Seine, France

Application February 27, 1948, Serial No. 11,674
In France January 2, 1945

Section 1, Public Law 690, August 8, 1946
Patent expires January 2, 1965

6 Claims. (Cl. 250—83)

It is well known to use for a great number of applications, e. g. for the detection of bodies by means of long wave infra-red rays, thermal receivers such as thermoelectric cells, balometers and the like. Now, as such receivers are very delicate and sensitive, it is necessary to protect them from various parasitic factors, such for example as foreign radiations that may be considerably stronger than the radiation intended to be received, variations of magnetic and electric fields, adiabatic compressions of air that produce temperature variations in the thermoelectric elements, etc.

This invention has for its object to provide a device for protecting a receiver of the kind referred to from the aforesaid parasitic factors, which device consists substantially of a scaled internal envelop of non-magnetic material, such for example as copper, enclosing the receiver, and an external envelop of magnetic material, such for example as mild steel, enclosing and supporting said internal envelop, the space between the two envelops being filled up with a heat-insulating material such for example as eider-down, said internal envelop comprising a collecting lens and cooperating mirrors constituted for example by polished or silvered inner surfaces of this envelop, whereby the incident thermal rays may be concentrated on the receiver thus sheltered from the respective parasitic factors.

The invention is illustrated in the accompanying diagrammatic drawings which show by way of example some embodiments thereof and in which Fig. 1 is a sectional elevational view showing a form of protective device according to the present invention;

Fig. 2 shows a further form of protective device according to the invention;

Fig. 3 shows yet a further form of protective device according to the invention; and Fig. 4 shows a further form of protective device according to the invention.

In these drawings, similar numerals of reference indicate like parts throughout the several views.

For the sake of clarity, the invention as illustrated in these drawings, will be described in connection with an orientable detecting telescope of the Gregory type wherein the image of the scene under scansion, formed by its concave mirror 1, is focused by means of a collecting lens 2 on to a small concave mirror 3 which is constituted preferably by silvered copper and from which this image is concentrated on a receiver 4 which, in the examples shown, takes the form of a thermoelectric cell. It is namely this receiver 4 which is intended to be protected from the aforesaid parasitic factors by a protective device according to the present invention.

Referring now to Fig. 1, it will be seen that the protective device shown therein comprises, on one hand, an internal envelop which is composed of a window sealed by the collecting lens 2, a small concave mirror 3, a hemispherical concave mirror 5 into which is fitted the mirror 3 and of which the center of curvature is located at the center of the sensitive surface of the cell 4, a plane mirror 6 that coincides with the equator of the hemisphere 5 and has a central opening just sufficient for passing the flux of detection, a second hemispherical concave mirror 7 which has its center of curvature located at the center of the window 2 and the inner surface of which passes through the inner peripheral edge of the central opening in the mirror 6, and a plane mirror 8 that closes said internal envelop, while coinciding with the equator of the hemisphere 7, and has a central hole into which there is tightly fitted the lens 2, and on the other hand, an external envelop 9 supporting in it said internal envelop by means of a short thin-wall tube 10 surrounding the lens 2, the space between the two envelops being filled up with heat insulating material, such for example as eider-down. The mirrors 3, 5, 6, 7, 8 are preferably constituted by polished or silvered copper, while the tube 10 and the external envelop 9 are preferably made of mild steel, the outer surface of envelop 9 being polished.

The action of the protective device as just described is as follows:

(a) It reduces the effects due to variations of the surrounding temperature. The influence of these variations on the receiver is greatly diminished, because the mass of copper of various mirrors constituting the internal envelop is thermally insulated from the external envelop 9 by the intermediate layer of eider-down or the like and is connected thereto only by means of the short thin-wall tube 10 the heat-conduction of which is practically insignificant. On the other hand, the high thermal conductibility of copper serves to equalize the temperature of the various parts of protective device. Small variations introduced into the device by the supporting tube 10 remain substantially centered on the device axis, wherefore the variations in the radiation proper of these parts, likely to reach the cell 4, act almost similarly upon the two sensitive surfaces of the cell 4, one of them being directly influenced or "hot" and the other "cold."

(b) It eliminates parasitic radiations. It is to be pointed out that only the external radiation coming from the field scanned by the telescope, i. e. coming from the mirror 1 and impinging on the lens 2, can reach the sensitive surface of thermocell 4. Indeed, a ray that traverses the lens 2 without coming from the mirror 1 impinges on the mirror 7 and is expelled by the latter, through the lens 2, out of the protective device. Such a ray, therefore, cannot reach the sensitive surface of the cell and cannot be absorbed by the protective device and, consequently, will not raise its temperature. Only the rays perchance slipping in around the mirror 1 may reach the mirror 5 which, however, sends them back past the sensitive surface of the cell 4, since they cannot impinge on the mirror 3 upon which are focused the rays coming in from the mirror 1. On the other hand, as the outer surface of the envelop 9 is polished, it is clear that the cell 4 is sheltered from the major part of external parasitic radiations, most of which are reflected away from this surface, and that the variations of temperature produced within the proctective device by these parasitic radiations are greatly reduced.

Greatly reduced is also the radiation proper of the mirrors surrounding the cell 4, firstly because these mirrors are constituted by silvered or polished copper surfaces, and secondly because their form and disposition are such as to prevent a ray, which has undergone several reflections, from finally impinging on the sensitive surface of the cell. At the last, owing to that the protective device is disposed symmetrically with respect to the cell axis and that the temperatures of different points of the mirrors are well equalized by conduction in the copper, any residual radiations act symmetrically upon the two sensitive surfaces of the cell.

(c) It reduces parasitic influences of the magnetic field, owing to the external envelop of mild steel.

(d) It reduces parasitic influences of the electric field owing to the double metallic envelop.

The protective device just described in detail and shown in Fig. 1 may be modified by discarding the mirrors 3, 5, 8 and disposing the mirrors 5, 7 as shown in Fig. 2. Here, all the rays coming in from the mirror 1 should meet theoretically at the focus 17 of this mirror but in fact are intercepted by the collecting lens 2 of the internal envelop and concentrated on the lower sensitive surface of the thermocell 4. The hemispherical mirror 7 is here inverted and its inner surface passes through the peripheral edge of lens 2, having its center of curvature located at the center of the sensitive surface of the cell. The mirror 5 here takes the form of a spherical cap extending from the equator of said hemispherical mirror 7 and having its center of curvature blending with the center of lens 2. It will be seen that here no rays foreign to the mirror 1 can penetrate into the internal envelop constituted by the lens 2 and mirrors 5, 7.

While the forms of protective device shown in Figs. 1 and 2 are intended mainly for highly accurate work, the modified form shown in Fig. 3 may be used for somewhat less accurate work.

It will be seen that the modified form shown in Fig. 3 differs from the form of Fig. 1 only in that the mirrors 5, 6 are discarded and the mirror 3 is fitted directly into the mirror 7 opposite the cell 4 and collecting lens 2, wherefore some rays foreign to the mirror 1 and likely to slip through the lens 2 into the internal envelop may happen to reach the cell 4 and somewhat adversely influence the same, instead of being expelled by the mirrors 5, 6 as explained in connection with Fig. 1.

In the modified form shown in Fig. 4, suitable for almost any class of work, only the mirror 8 is discarded, while the mirror 7, into which the mirror 3 is fitted opposite the cell 4 and lens 2 and which carries the mirrors 5 and 6, takes the form of a hollow cylinder extending from the mirror 6 to the lens 2 and provided with a series of internal diaphragms with sharp tops denoted by reference 18. It will be seen that the major part of rays foreign to the mirror 1, which may happen to penetrate through the lens 2 into the internal envelop, will be prevented by said diaphragms from reaching the cell 4 and hence from adversely influencing the same.

What is claimed is:

1. Device for protecting thermal receivers, of the class comprising thermoelectric cells, bolometers and the like, from parasitic influences of the temperature, magnetic and electric fields, said device being symmetrical with respect to the receiver axis and consisting of a sealed internal envelope of non-magnetic material enclosing said receiver, and an external outerly polished envelop of magnetic material enclosing and supporting in it said internal envelop, the space between the two envelops being filled up with heat insulating material, said internal envelop including refractive means, cooperating reflective means concentrating the incident thermal rays and sensitive surfaces receiving said concentrated thermal rays.

2. In a protective device for a thermal receiver of the type stated, an internal sealed envelop of non-magnetic metal housing said thermal receiver, an external outerly polished envelope of magnetic material surrounding said internal envelop, a tubular member tightly interconnecting both envelops, heat insulating material filling up the space between the two envelops, a thermal light collecting optical system tightly fitted into said tubular member collecting the incident thermal rays, and a system of mirrors formed by the inner surfaces of said internal envelop concentrating the collected thermal rays on a sensitive surface of said receiver.

3. In protective device of the type stated, a system of mirrors formed by the inner surfaces of the internal envelop, said system comprising a flat mirror perpendicular to the receiver axis and symmetrical with respect to this axis, a hemispherical mirror having for its equator said flat mirror, a small equally symmetrical spherical mirror capping said hemispherical mirror, a small flat mirror provided between said cap and hemispherical mirror and formed with a central opening facing the receiver, and a small equally symmetrical mirror fitted into said cap for receiving the incoming thermal rays and concentrating the same through said opening on a sensitive surface of the receiver, all the mirrors except the last one serving to expel any parasitic factors likely to occur in the said internal envelop.

4. In protective device of the type stated, a system of mirrors formed by the inner surfaces of the internal envelop, said system comprising a spherical mirror symmetrical with respect to the receiver axis and having its center of curvature located at the center of said receiver, and an equally symmetrical spherical mirror closing the first-mentioned mirror and having its center of curvature blending with the center of the collecting optical system adapted to concentrate the incoming thermal rays on a sensitive surface of said receiver.

5. In protective device of the type stated, a system of mirrors formed by the inner surfaces of the internal envelop, said system comprising a flat mirror perpendicular to the receiver axis and symmetrical with respect to this axis, a hemispherical mirror having for its equator said flat mirror, and a small equally symmetrical mirror fitted into said hemispherical mirror for receiving the incoming thermal rays and concentrating the same on a sensitive surface of the said receiver, the two first-mentioned mirrors serving to expell parasitic factors likely to occur in the said internal envelop.

6. In protective device of the type stated, a system of mirrors formed by the inner surfaces of the internal envelop, said system comprising a hollow cylindrical member symmetrical with respect to the receiver axis and having in it a series of circular diaphragms with sharp tops extending from the receiver to the collecting optical system, a spherical equally symmetrical mirror topping said cylindric member, a flat mirror provided between said cylinder and spherical mirror and formed with a central opening facing said receiver, and a small equally symmetrical mirror fitted into said spherical mirror for concentrating through said opening the incoming thermal rays on a sensitive surface of the said receiver, said diaphragms serving to prevent parasitic factors likely to occur in the said internal envelop from adversely influencing the receiver.

ANDRÉ ALBERT CHARLES BAYLE.

REFERENCES CITED

The following references are of record in the file of this patent:

UNITED STATES PATENTS

| Number | Name | Date |
| --- | --- | --- |
| 842,314 | Heeley et al. | Jan. 29, 1947 |